Dec. 12, 1939.  D. A. BOYD  2,183,004

SEAL

Filed Oct. 29, 1937

INVENTOR
DONALD A. BOYD
BY
ATTORNEY

Patented Dec. 12, 1939

2,183,004

UNITED STATES PATENT OFFICE 2,183,004

SEAL

Donald A. Boyd, Detroit, Mich.

Application October 29, 1937, Serial No. 171,718

1 Claim. (Cl. 288—3)

This invention relates to a packing and more particularly to a packing member which may be inserted as a unit in a housing surrounding a centrally located shaft.

An object of the invention is to provide an inexpensive structure which may be assembled with a minimum number of parts, and to provide means for sealing the packing member with the outer periphery of the cage member.

A further object of the invention is to provide a molded yieldable packing member having its inner peripheral flange thickened.

Other objects and advantages of the invention will be more apparent from the following description taken in connection with the accompanying drawing, in which.

Figure 1:
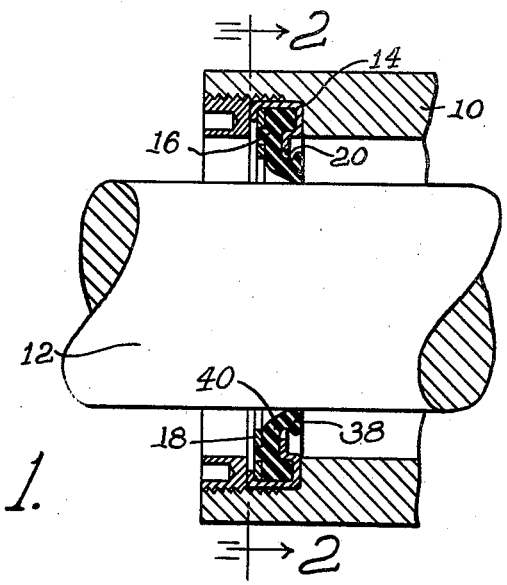
Fig. 1 is a longitudinal sectional view through a housing illustrating the improved seal in section and surrounding a centrally located shaft, the latter being shown in elevation.
Figure 3:
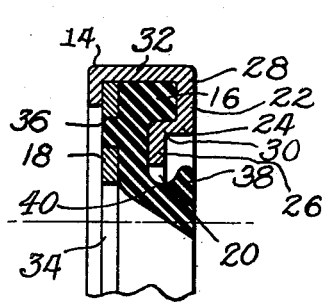
Fig. 3 is an enlarged sectional view illustrating a portion of the seal shown in Figs. 1 and 2.
Figure 2:
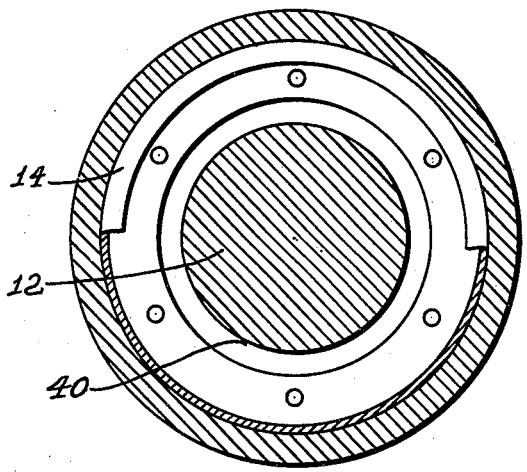
Fig. 2 is a sectional view on line 2—2 of Fig. 1 showing an end view of the seal, a portion thereof being broken away and in section.

Referring to the drawing, the seal is adapted to be inserted in a housing 10 in encompassing relation to a centrally located shaft 12. The seal consists of a retainer 14 and a packing member 16 secured to a backing 18. The retainer 14 consists of a cup-shaped member having an opening 20 in the bottom wall 22 for reception of the shaft 12. The bottom wall 22 is depressed as at 24 forming axially spaced radially and oppositely extending flanges 26 and 28 with an intermediate flange 30 extending parallel to the outer peripheral portion 32 of the retainer 14.

The packing 16 is formed from any suitable pliable material which may be molded and in the form illustrated it is preferably made of molded rubber bonded to the backing member 18. The latter is a substantially flat washer having a central opening 34 of substantially the diameter of the opening 20 in the retainer 14. The backing 18 is provided with a plurality of openings 36 into which the molded material extends to form retaining means. The material 16 may be vulcanized to the inner surface of the backing 18.

The packing 16 has a portion extending diagonally and radially toward the shaft 12 through an opening 20 of the retainer 14 and has an enlarged portion 38 at the outer edge thereof and an intermediate smaller portion 40. The latter provides a resilient bent for permitting distortion of the end portion 38 such as is required when it is in encompassing relation to the shaft 12. The enlarged end 38 provides a more rigid construction and of less resiliency to urge the free end of the packing into sealing engagement with the shaft. By this construction the enlarged end eliminates the necessity for an additional means for urging the free end of the packing member into sealing engagement with the associated shaft.

Various changes, including the size, shape and arrangement of parts, may be made without departing from the spirit of the invention and it is not my intention to limit the scope thereof other than by the terms of the appended claim.

I claim:

A self-contained seal for insertion in a housing surrounding a shaft comprising a centrally apertured cup having an annular peripheral portion and a radially extending flange, said flange being bent axially inwardly forming an inner axially extending flange spaced radially from said annular peripheral portion and then bent radially to form a second radially extending flange, a centrally apertured ring having a plurality of openings in the body portion thereof arranged radially in said cup and spaced from the radially extending portions of said cup, said flanges and said ring cooperating to form a radially outwardly disposed cup portion and an adjacent radially inwardly disposed second cup portion having an axial dimension less than that of said first mentioned cup portion, and a synthetic rubber composition packing moulded in the space between said ring and said radially extending flanges and in the openings of said ring, said packing having an enlarged portion disposed in said first mentioned cup portion and a neck-like portion disposed in said second mentioned cup portion and engaged by said second radially extending flange, a portion of said neck-like portion extending generally obliquely with respect to the axis of said cup and providing a sealing face engageable with said shaft, said neck-like portion terminating in an enlarged extremity disposed axially beyond the outer face of said second mentioned radially extending flange, the free edge of the latter being radially spaced from the radial outer face of the obliquely extending portion of said neck-like portion.

DONALD A. BOYD.